(12) United States Patent
Ishii et al.

(10) Patent No.: US 7,040,445 B2
(45) Date of Patent: May 9, 2006

(54) HYDRAULIC DRIVING APPARATUS FOR A WHEELED VEHICLE

(76) Inventors: Norihiro Ishii, 2-18-1, Inadera, Amagasaki-shi (JP); Hiroshi Tottori, 2-18-1, Inadera, Amagasaki-shi (JP); Shusuke Nemoto, 2-18-1, Inadera, Amagasaki-shi (JP)

( * ) Notice: Subject to any disclaimer, the term of this patent is extended or adjusted under 35 U.S.C. 154(b) by 268 days.

(21) Appl. No.: 10/421,908

(22) Filed: Apr. 24, 2003

(65) Prior Publication Data

US 2003/0201134 A1 Oct. 30, 2003

(30) Foreign Application Priority Data

Apr. 24, 2002 (JP) .................................. 2002-121846

(51) Int. Cl.
*B60K 17/00* (2006.01)

(52) U.S. Cl. ...................................... 180/307; 180/305

(58) Field of Classification Search ................. 180/6.2, 180/6.3, 6.24, 6.26, 6.32, 6.48, 305, 307, 180/308
See application file for complete search history.

(56) References Cited

U.S. PATENT DOCUMENTS

| 168,955 A | 10/1875 | Annin |
| 2,191,961 A | 2/1940 | Howell |

(Continued)

FOREIGN PATENT DOCUMENTS

| CH | 249274 | 6/1947 |
| DE | 4224887 | 9/1993 |

(Continued)

OTHER PUBLICATIONS

Excel Industries Inc., "U–T–R The Ultimate Turning Radius," pp. 1–6, Dec. 1992.
Electric Tractor Corporation, "An Idea Whose Time Has Come," 5 pages, date of publication unknown, published in Ontario, Canada.
Electric Tractor Corporation, Model #9620– The Ultimate Lawn and Garden Tractor, 6 pages, printed, Jul. 27, 1998.
Farm Show Magazine, "Battery Powered Riding Mower," 1 page, date of publication, Mar.–Apr. 1996.
Deere & Company, "240, 245, 260, 265, 285 and 320 Lawn and Garden Tractors, Technical Manual," front cover and pp. 10–2 to 10–4 and 10–6, dated Sep. 26, 1996.

(Continued)

*Primary Examiner*—Christopher P. Ellis
*Assistant Examiner*—Kelly E Campbell
(74) *Attorney, Agent, or Firm*—Sterne Kessler, Goldstein & Fox P.L.L.C.

(57) ABSTRACT

A hydraulic driving apparatus for a wheeled vehicle including a prime mover and a pair of wheels comprises a stepless transmission mechanism for traveling which transmits driving force from the prime mover to the drive wheels so as rotate the drive wheels in a common forward or rearward direction, and a steering transmission mechanism including a hydrostatic stepless transmission including a variable hydraulic pump and a hydraulic motor fluidly connected to each other, wherein a rotational force of the hydraulic motor is divided into opposite directive rotations transmitted to the respective drive wheels. A switching valve is disposed between the variable hydraulic pump and the hydraulic motor in the steering transmission mechanism. The switching valve reverses the rotational direction of the motor relative to the discharge direction from the pump according to a change in the traveling direction of the vehicle between forward and rearward, and divides a pair of oil passages between the pump and the motor into independent circuits which include the pump and the motor, respectively.

9 Claims, 13 Drawing Sheets

U.S. PATENT DOCUMENTS

| | | | |
|---|---|---|---|
| 2,255,348 A | 9/1941 | Brown | |
| 2,311,922 A | 2/1943 | Allin | |
| 2,332,838 A | 10/1943 | Borgward | |
| 2,336,911 A | 12/1943 | Zimmerman | |
| 2,336,912 A | 12/1943 | Zimmerman | |
| 2,391,735 A | 12/1945 | Orshansky, Jr. | |
| 2,530,720 A | 11/1950 | Paulson | |
| 2,745,506 A | 5/1956 | McCallum | |
| 2,763,164 A | 9/1956 | Neklutin | |
| 2,936,033 A | 5/1960 | Gates | |
| 3,059,416 A | 10/1962 | Campbell | |
| 3,371,734 A | 3/1968 | Zaunberger | |
| 3,376,760 A | 4/1968 | Gordanier | |
| 3,395,671 A | 8/1968 | Zimmerman | |
| 3,450,218 A | 6/1969 | Looker | |
| 3,477,225 A | 11/1969 | Cryder et al. | |
| 3,492,891 A | 2/1970 | Livezey | |
| 3,530,741 A | 9/1970 | Charest | |
| 3,590,658 A | 7/1971 | Tuck | |
| 3,596,535 A | 8/1971 | Polak | |
| 3,603,176 A | 9/1971 | Tipping et al. | |
| 3,612,199 A | 10/1971 | Visser | |
| 3,717,212 A | 2/1973 | Potter | |
| 3,796,275 A | 3/1974 | Bouyer | |
| 3,869,014 A | 3/1975 | Federspiel et al. | |
| 3,901,339 A | 8/1975 | Williamson | |
| 3,903,977 A | 9/1975 | Gillette et al. | |
| 3,907,051 A | 9/1975 | Weant et al. | |
| 3,966,005 A | 6/1976 | Binger | |
| 3,978,937 A | 9/1976 | Chichester et al. | |
| 4,087,970 A | 5/1978 | Slazas et al. | |
| 4,133,404 A | 1/1979 | Griffin | |
| 4,174,762 A * | 11/1979 | Hopkins et al. | 180/6.44 |
| 4,245,524 A | 1/1981 | Dammon | |
| 4,281,737 A | 8/1981 | Molzahn | |
| 4,320,810 A | 3/1982 | Hillmann et al. | |
| 4,368,798 A * | 1/1983 | Meyerle et al. | 180/307 |
| 4,399,882 A | 8/1983 | O'Neill et al. | |
| 4,402,181 A * | 9/1983 | Acker et al. | 60/427 |
| 4,471,669 A * | 9/1984 | Seaberg | 475/24 |
| 4,569,251 A | 2/1986 | Greenwood | |
| 4,572,310 A | 2/1986 | Peter | |
| 4,577,711 A | 3/1986 | Butler | |
| 4,620,575 A | 11/1986 | Cuba et al. | |
| 4,631,980 A * | 12/1986 | Ishimori | 74/732.1 |
| 4,718,508 A | 1/1988 | Tervola | |
| 4,729,257 A | 3/1988 | Nelson | |
| 4,732,053 A | 3/1988 | Gleasman et al. | |
| 4,738,328 A | 4/1988 | Hayden | |
| 4,776,235 A | 10/1988 | Gleasman et al. | |
| 4,776,236 A | 10/1988 | Gleasman et al. | |
| 4,782,650 A | 11/1988 | Walker | |
| 4,790,399 A | 12/1988 | Middlesworth | |
| 4,807,904 A | 2/1989 | Kamlukin et al. | |
| 4,809,796 A | 3/1989 | Yamaoka et al. | |
| 4,813,506 A | 3/1989 | Smith | |
| 4,870,820 A | 10/1989 | Nemoto | |
| 4,875,536 A | 10/1989 | Saur et al. | |
| 4,882,947 A | 11/1989 | Barnard | |
| 4,886,142 A * | 12/1989 | Yamaoka et al. | 180/242 |
| 4,890,508 A | 1/1990 | Zaunberger | |
| 4,895,052 A | 1/1990 | Gleasman et al. | |
| 4,914,907 A | 4/1990 | Okada | |
| 4,917,200 A | 4/1990 | Lucius | |
| 4,932,209 A | 6/1990 | Okada et al. | |
| 4,949,823 A | 8/1990 | Coutant et al. | |
| 4,977,760 A | 12/1990 | Ishimori et al. | |
| 5,004,060 A | 4/1991 | Barbagli et al. | |
| 5,015,221 A | 5/1991 | Smith | |
| 5,026,333 A | 6/1991 | Meyerle | |
| 5,042,238 A | 8/1991 | White, III et al. | |
| 5,052,511 A | 10/1991 | Hunt | |
| 5,056,615 A * | 10/1991 | Duthie et al. | 180/306 |
| 5,094,326 A | 3/1992 | Schemelin et al. | |
| 5,131,483 A | 7/1992 | Parkes | |
| 5,137,100 A | 8/1992 | Scott et al. | |
| RE34,057 E | 9/1992 | Middlesworth | |
| 5,146,748 A | 9/1992 | Okada | |
| 5,195,600 A | 3/1993 | Dorgan | |
| 5,201,240 A | 4/1993 | Hayes et al. | |
| 5,215,056 A | 6/1993 | Harada et al. | |
| 5,247,784 A | 9/1993 | Kitamura et al. | |
| 5,279,376 A | 1/1994 | Yang et al. | |
| 5,285,866 A | 2/1994 | Ackroyd | |
| 5,307,612 A | 5/1994 | Tomiyama et al. | |
| 5,314,387 A | 5/1994 | Hauser et al. | |
| 5,335,739 A | 8/1994 | Pieterse et al. | |
| 5,339,631 A | 8/1994 | Ohashi | |
| 5,355,661 A | 10/1994 | Tomiyama | |
| 5,367,861 A | 11/1994 | Murakawa et al. | |
| 5,383,528 A | 1/1995 | Nicol | |
| 5,387,161 A | 2/1995 | Shibahata | |
| 5,505,279 A | 4/1996 | Louis et al. | |
| 5,507,138 A | 4/1996 | Wright et al. | |
| 5,509,496 A | 4/1996 | Erickson et al. | |
| 5,511,631 A | 4/1996 | Tsuchihashi et al. | |
| 5,517,809 A | 5/1996 | Rich | |
| 5,535,840 A | 7/1996 | Ishino et al. | |
| 5,553,453 A | 9/1996 | Coutant et al. | |
| 5,560,447 A | 10/1996 | Ishii et al. | |
| 5,564,518 A | 10/1996 | Ishii et al. | |
| 5,644,903 A | 7/1997 | Davis, Jr. | |
| 5,649,606 A | 7/1997 | Bebernes et al. | |
| 5,667,032 A | 9/1997 | Kamlukin | |
| 5,706,907 A | 1/1998 | Unruh | |
| 5,722,501 A | 3/1998 | Finch et al. | |
| 5,775,437 A | 7/1998 | Ichikawa et al. | |
| 5,782,142 A | 7/1998 | Abend et al. | |
| 5,823,285 A * | 10/1998 | Tsuchihashi et al. | 180/242 |
| 5,842,378 A | 12/1998 | Zellmer | |
| 5,850,886 A | 12/1998 | Kouno et al. | |
| 5,887,671 A | 3/1999 | Yuki et al. | |
| 5,894,907 A | 4/1999 | Peter | |
| 5,910,060 A | 6/1999 | Blume | |
| 5,911,669 A | 6/1999 | Stentz et al. | |
| 5,913,802 A | 6/1999 | Mullet et al. | |
| 5,946,894 A | 9/1999 | Eavenson et al. | |
| 5,947,219 A | 9/1999 | Peter et al. | |
| 5,975,224 A | 11/1999 | Satzler | |
| 5,997,425 A | 12/1999 | Coutant et al. | |
| 6,026,634 A | 2/2000 | Peter et al. | |
| 6,029,761 A | 2/2000 | Gustafson et al. | |
| 6,035,959 A | 3/2000 | Schaedler | |
| 6,038,840 A | 3/2000 | Ishimori et al. | |
| 6,082,084 A | 7/2000 | Reimers et al. | |
| 6,098,386 A | 8/2000 | Shimizu et al. | |
| 6,098,737 A | 8/2000 | Aoki | |
| 6,098,740 A | 8/2000 | Abend et al. | |
| 6,126,564 A | 10/2000 | Irikura et al. | |
| 6,129,164 A | 10/2000 | Teal et al. | |
| 6,141,947 A | 11/2000 | Borling | |
| 6,152,248 A | 11/2000 | Hidaka et al. | |
| 6,189,641 B1 | 2/2001 | Azuma | |
| 6,196,342 B1 | 3/2001 | Teal et al. | |
| 6,196,348 B1 | 3/2001 | Yano et al. | |
| 6,257,357 B1 | 7/2001 | Teal et al. | |
| 6,260,641 B1 * | 7/2001 | Hidaka | 180/6.44 |
| 6,276,468 B1 | 8/2001 | Essig et al. | |
| 6,283,236 B1 | 9/2001 | Teal et al. | |
| 6,312,354 B1 | 11/2001 | Irikura et al. | |
| 6,336,513 B1 | 1/2002 | Hasegawa et al. | |

| | | | |
|---|---|---|---|
| 6,354,388 B1 | 3/2002 | Teal et al. | |
| 6,381,529 B1 * | 4/2002 | Mistry | 701/51 |
| 6,390,227 B1 | 5/2002 | Abend et al. | |
| 6,397,966 B1 | 6/2002 | Irikura et al. | |
| 6,447,419 B1 | 9/2002 | Irikura | |
| 6,454,032 B1 | 9/2002 | Teal et al. | |
| 6,478,706 B1 | 11/2002 | Crabb | |
| 6,484,827 B1 | 11/2002 | Teal et al. | |
| 6,524,205 B1 | 2/2003 | Irikura | |
| 6,540,633 B1 * | 4/2003 | Hasegawa et al. | 475/24 |
| 6,543,548 B1 | 4/2003 | Ichikawa et al. | |
| 6,547,685 B1 | 4/2003 | Kawada | |
| 6,554,085 B1 | 4/2003 | Hasegawa | |
| 6,629,577 B1 | 10/2003 | Abend | |
| 6,644,429 B1 * | 11/2003 | Evans et al. | 180/307 |
| 6,755,264 B1 | 6/2004 | Hasegawa et al. | |
| 2003/0106725 A1 | 6/2003 | Irikura | |

FOREIGN PATENT DOCUMENTS

| | | |
|---|---|---|
| EP | 806337 A1 | 11/1997 |
| FR | 1147142 | 11/1957 |
| GB | 2303829 A | 3/1997 |
| JP | 57140277 | 8/1982 |
| JP | 63227476 | 9/1988 |
| JP | 1160783 | 6/1989 |
| JP | 2261952 | 10/1990 |
| JP | 6264976 | 9/1994 |
| JP | 3176237 | 6/1996 |
| JP | 8142906 | 6/1996 |
| JP | 9202255 | 8/1997 |
| JP | 9202258 | 8/1997 |
| JP | 9202259 | 8/1997 |
| JP | 9216522 | 8/1997 |
| JP | 10095360 | 4/1998 |
| JP | 2000-25637 | 1/2000 |
| WO | WO 92/12889 | 8/1992 |
| WO | WO 98/32645 | 7/1998 |
| WO | WO 99/40499 | 8/1999 |
| WO | WO 00/01569 | 1/2000 |
| WO | WO 00/19127 | 4/2000 |

OTHER PUBLICATIONS

Excel Industries, Inc., "Hustler 4000 Series," product brochure, pp. 1–8, Dec. 1995.

Woods Equipment Company, "Woods Mow'n Machine," product brochure, pp. 1–12, Dec. 1997.

Ex–Mark, "ExMark Nobody Does It Better—Professional Turf Care Equipment," pp. 1–20, Dec. 1997.

Dixon Industries, Inc., "Dixon ZTR Riding Mowers," pp. 1–4, Dec. 1997.

Shivers Mfg., "Zero Turn Radius Mower—The Commercial Clipper,", pp. 1–4, Dec. 1997.

Ogorkiewicz, R. M., "Tank Steering Mechanisms," The Engineer, pp. 337–340, Mar. 3, 1967.

Ferris Industries Inc., "The ProCut Z Zero–Turn Rider," pp. 1–2, Dec. 1997.

Zipper–TS Mower, "The Zipper–TS Mowers," pp. 1–2, 1997.

Westwood, "The Westwood Clipper Owners Instruction Manual," pp. 1–17 and 19, date of publication unknown.

Brochure regarding differential steering, pp. 4–15, date of publication unknown.

Bargo, Michael, Jr,, "Tanks And Dozers Turn On A Dime With New All Gear Steering," *Popular Science,* pp. 60–62, Jul. 1985.

\* cited by examiner

| SENSORS | | LOCATION OF VALVE 58 RELATIVE TO SENSORS | | | | | | | | |
|---|---|---|---|---|---|---|---|---|---|---|
| 62 | R54 | X | O | X | X | X | O | O | X | X |
|  | L54 | X | X | O | X | X | X | X | O | O |
|  | N54 | O | X | X | O | O | X | X | X | X |
| 63 | F51 | X | X | X | O | X | O | X | O | X |
|  | R51 | X | X | X | X | O | X | O | X | O |
|  | N51 | O | O | O | X | X | X | X | X | X |
| 58 | | N | N | N | N | N | F | R | F | R |

Fig. 5

| SENSOR | | LOCATION OF VALVE 58 RELATIVE TO SENSORS | | | | | | | | |
|---|---|---|---|---|---|---|---|---|---|---|
| 62 | R54 | X | O | X | X | X | O | O | X | X |
|    | L54 | X | X | O | X | X | X | X | O | O |
|    | N54 | O | X | X | O | O | X | X | X | X |
| 63 | F51 | X | X | X | O | X | O | X | O | X |
|    | R51 | X | X | X | X | O | X | O | X | O |
|    | N51 | O | O | O | X | X | X | X | X | X |
| 58 | | N | F | F | N | N | F | R | F | R |

HYDRAULIC DRIVING APPARATUS FOR A WHEELED VEHICLE

BACKGROUND OF THE INVENTION

1. Field of the Invention

The present invention relates to a hydraulic driving apparatus for a wheeled vehicle, which comprises a hydrostatic transmission (hereinafter referred to as an "HST") for steering, i.e., for applying oppositely directive rotational forces to respective right and left drive wheels so as to turn the vehicle, wherein the HST is so constructed that a steering operational direction constantly corresponds to right-and-left turning direction of the vehicle whether the vehicle travels forward or rearward.

2. Background Art

Conventionally, as disclosed in Japanese Laid Open Gazette No. 2000-25,637, there is a well-known driving apparatus of a wheeled vehicle such as a tractor, which comprises a pair of HSTs, i.e., one for traveling (a traveling HST) and the other for steering (a steering HST), each of which is a fluid connection of hydraulic pump and motor through a pair of oil passages, wherein output rotational direction and speed of the hydraulic motor in each of the HSTs is decided by operating a correspondent one of traveling operation means and steering operation means (usually, the capacity and discharging direction of each of the hydraulic pumps is set in correspondence to the location of a movable swash plate of the hydraulic pump by the operation so as to decide the output rotational speed and direction of the hydraulic motor). For turning the vehicle, left and right axles are driven at a common speed and in a common direction by the hydraulic motor in the traveling HST (the traveling motor) and are driven at different speeds or in opposite directions by output of the hydraulic motor in the steering HST (the steering motor). Further, the hydraulic driving apparatus includes means which changes the output rotational direction of the steering motor according to switching the setting of the traveling operation means between forward traveling mode and rearward traveling mode so that the vehicle turns to left or right side coinciding with the setting side of the steering operation means whether the vehicle travels forward or rearward.

To serve as the means for changing the output rotational direction of the steering motor, Japanese Laid Open Gazette No. 2000-25,637 discloses a mechanical switching device interposed on a link mechanism among the traveling operation means, the steering operation means and a movable swash plate of the hydraulic pump in the steering HST (the steering pump). However, such a mechanical switching device is complicated and expanded.

Japanese Patent No. 3,176,237 discloses a hydraulic switching valve, which is electrically controlled based on operation of the traveling operation means and the steering operation means. The switching valve is interposed across the pair of oil passages between the hydraulic pump and the hydraulic motor in the steering HST.

The switching valve disclosed in Japanese Patent No. 3,176,237 has four ports and is switched among a neutral position, a forward traveling position, and a rearward traveling position. The switching valve is located at its neutral position by setting the traveling operation means into neutral as well as setting the steering operation means into neutral, where the switching valve separately divides the pair of oil passages between the steering pump and the steering motor into a pair of oil passages on the steering pump side and a pair of oil passages of the steering motor side so as to stop the steering motor, thereby surely keeping the vehicle stationary. When the traveling operation means is set for forward traveling of the vehicle, the switching valve is located in its forward traveling position where the pair of oil passages on the steering pump side are connected to the respective oil passages on the steering motor side. When the traveling operation means is set for rearward traveling of the vehicle, the switching valve is located in its rearward traveling position where the oil passages on the steering motor side to be connected to the respective oil passages on the steering pump side are exchanged.

However, Japanese Patent No. 3,176,237, disclosing an agricultural combine having a pair of right and left sprockets driven by the hydraulic driving apparatus with the switching valve, does not disclose or suggest a wheeled vehicle employing the hydraulic driving apparatus with the switching valve.

Furthermore, the disclosed switching valve, when it is located in its neutral position, blocks the pair of oil passages on the hydraulic motor side, thereby blocking the hydraulic motor. In this situation, even if the ground is rough and the right and left drive axles are subjected to considerably different ground resistances, the blocked hydraulic motor does not rotate and does not absorb the resistant difference between the axles. Therefore, excessive stress is applied onto the hydraulic motor, the axles, and a drive train therebetween, and also, the ground surface such as turf may be damaged.

Another disadvantage of the disclosed switching valve which blocks the hydraulic motor when it is set in neutral, is that if the steering operation means is operated for turning right or left of the vehicle from the straight traveling setting, and the switching valve is switched from the neutral position to either the forward or rearward traveling position, the blocked hydraulic motor delays its start of rotation, thereby reducing the steering response.

If the hydraulic motor, when the switching valve is located in the neutral position, can be softly rotated, the above-mentioned problem is solved. However, the sure straight movability of the vehicle, when the steering operation means is set in the straight traveling position, is spoiled.

BRIEF SUMMARY OF THE INVENTION

An object of the present invention is to provide a hydraulic driving apparatus for a wheeled vehicle including a prime mover and a pair of drive wheels, wherein the turning side of the wheeled vehicle corresponds to steering operation direction whether the vehicle travels forward or rearward, and wherein, when the wheeled vehicle is set in stationary, the stationary state of the vehicle is kept. The hydraulic driving apparatus comprises a traveling transmission mechanism which transmits driving force from the prime mover to the drive wheels so as rotate the drive wheels in a common forward or rearward direction; a steering transmission mechanism including an HST as a fluidal connection of a variable hydraulic pump and a hydraulic motor, wherein a rotational force of the hydraulic motor is divided into opposite directive rotations transmitted to the respective drive wheels; traveling operation means for changing speed of the common rotation of the drive wheels and for switching the common rotational direction of the drive wheels between forward and rearward; and steering operation means for changing the rotational speed of the steering hydraulic motor and switching the rotational direction of the steering hydraulic motor between opposite directions.

To achieve the object, the hydraulic driving apparatus according to the present invention comprises a switching valve disposed between the variable hydraulic pump and the hydraulic motor in the steering transmission mechanism, wherein the switching valve is controlled based on setting of the traveling operation means. A neutral position is provided for location of the switching valve, wherein the switching valve is located in the neutral position so as to isolate the steering hydraulic motor from the steering variable hydraulic pump when the traveling operation means is set for stopping the drive wheels. A forward traveling position is provided for location of the switching valve, wherein the switching valve is located in the forward traveling position so as to fluidly connect the steering hydraulic motor with the steering variable hydraulic pump when the traveling operation means is set for rotating the drive wheels forward. A rearward traveling position is provided for location of the switching valve, wherein the switching valve is located in the rearward traveling position so as to fluidly connect the steering hydraulic motor with the steering variable hydraulic pump when the traveling operation means is set for rotating the drive wheels rearward, and wherein, in relation to the discharge direction of the steering variable hydraulic pump, the rotational direction of the steering hydraulic motor when the switching valve is located in the rearward traveling position is reversed in comparison with the rotational direction of the steering hydraulic motor when the switching valve is located in the forward traveling position.

To secure the straight movability of the wheeled vehicle set to travel straight, according to the present invention, the switching valve is preferably also controlled based on setting of the steering operation means. More specifically, the switching valve is preferably located in the neutral position when the steering operation means is set for stopping the steering hydraulic motor whether the traveling operation means is set for rotating the drive wheels forward or rearward.

To enable the vehicle, which is set to be stationary by the traveling operation means, to spin by operation of the steering operation means, according to the present invention, the switching valve is preferably located in either the forward traveling position or the rearward traveling position even when the traveling operation means is set for stopping the drive wheels unless the steering operation means is set for stopping the hydraulic motor.

To prevent unexpected spinning of the vehicle and to enable the vehicle to spin at a user's pleasure, according to the present invention, the switching valve is preferably selectively controlled according to either a first logic program or a second logic program, wherein, according to the first logic program, the switching valve is located in the neutral position when the traveling operation means is set for stopping the drive wheels, and wherein, according to the second logic program, the switching valve is located in either the forward traveling position or the rearward traveling position even when the traveling operation means is set for stopping the drive wheels unless the steering operation means is set for stopping the steering hydraulic motor.

If the selection of logic program depends on which the user prefers spinning of the wheeled vehicle or prevention of spinning, according to the present invention, one of the first logic program and the second logic program may be selected at an operator's option. Otherwise, the logic program may be automatically selected based on detection of an operator sitting on a seat of a wheeled vehicle having the hydraulic driving apparatus.

In this case, the vehicle is prevented from spinning unless the operator completely sits on the seat.

To protect the steering hydraulic motor from unbalanced load between the drive wheels, according to the present invention, the switching valve located in the neutral position preferably divides a hydraulic fluid circuit of the steering HST into two independent circuits, one of which includes the steering variable hydraulic pump, and the other of which includes the steering hydraulic motor. More preferably, in the circuit including the steering hydraulic motor, hydraulic fluid circulates according to rotation of the steering hydraulic motor. Therefore, if the wheeled vehicle travels straight and the drive wheels receive different resistances from a rough ground, the steering hydraulic motor independent of the steering hydraulic pump is softly rotated corresponding to the unbalanced load between the drive wheels and allows the drive wheels to rotate relative to each other.

Also, to prevent such an excessively sensitive relative rotation of the drive wheels as to spoil the straight movability of the wheeled vehicle, the hydraulic driving apparatus according to the present invention preferably comprises a differential limiting mechanism for limiting differential rotation of the drive wheels.

These, other and further objects, features and advantages of the invention will appear more fully from the following description.

BRIEF DESCRIPTION OF THE DRAWINGS/ FIGURES

Figures 3, 4:
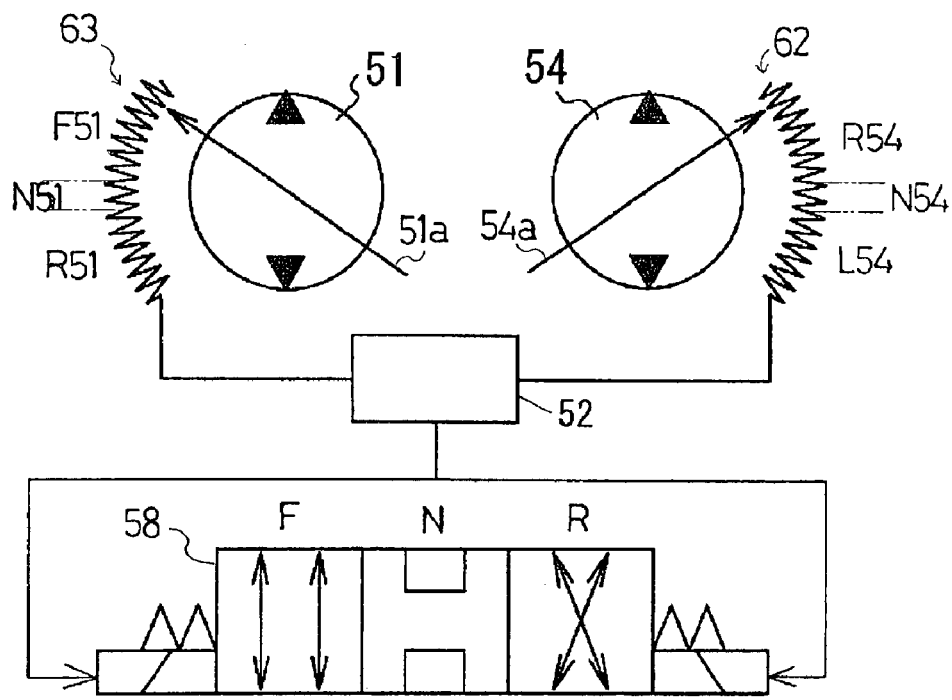

FIG. 3 is a diagram of an electromagnetic pilot circuit of a switching valve 58 in association with a controller 52 to which detection signals from a traveling sensor 63 and a steering sensor 62 are inputted.

FIG. 4 is a first logic diagram showing location of the switching valve 58 in relation to detected signals from sensors 62 and 63.

FIG. 5 is a second logic diagram showing location of the switching valve 58 in relation to detected signals from sensors 62 and 63, which is used to enable the vehicle to spin.

Figure 6:
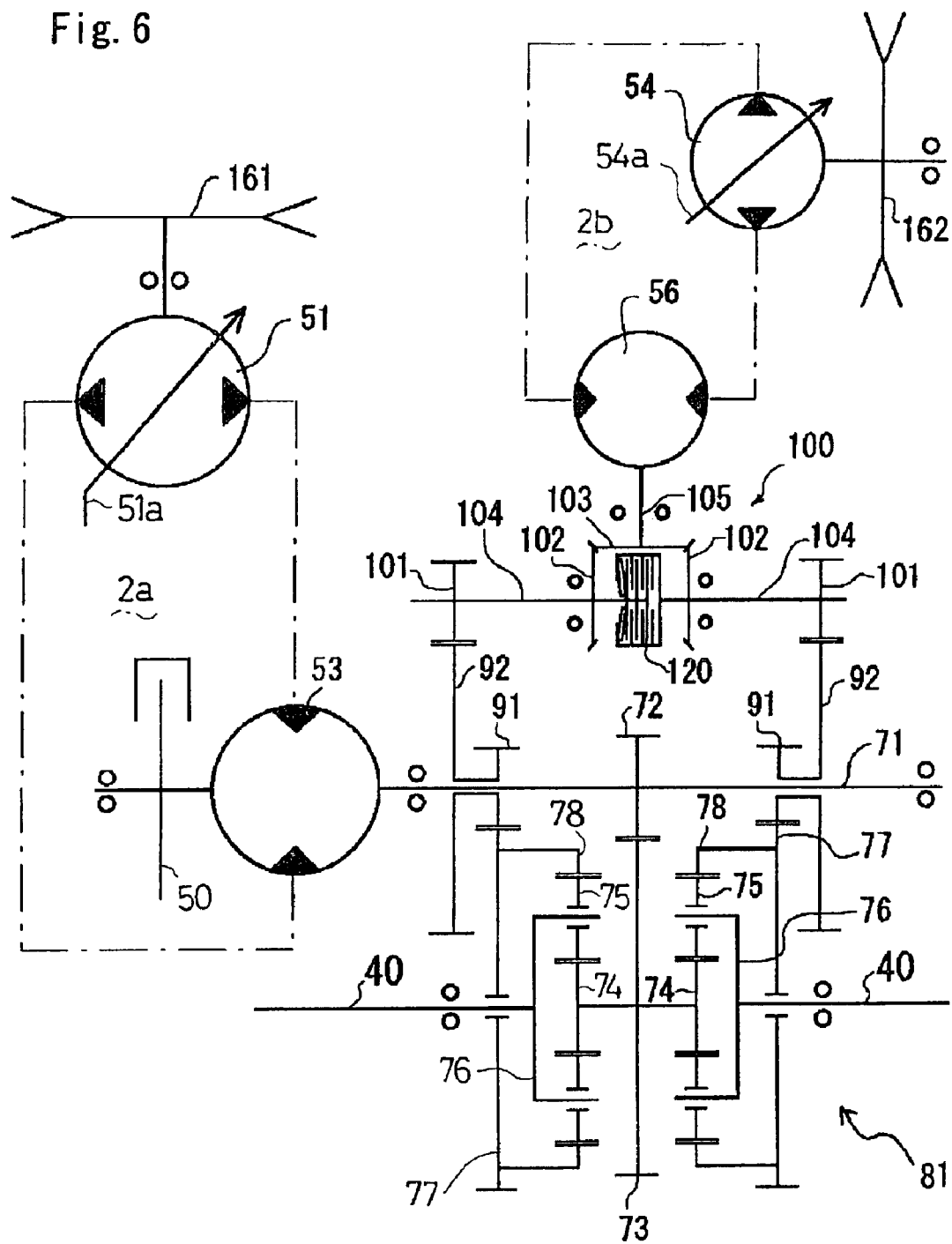

FIG. 6 is a structure and hydraulic circuit diagram of a hydraulic driving apparatus for a wheeled vehicle according to a first embodiment of the present invention, wherein a differential limiter 120 is interposed between differential shafts 104 in a differential gear mechanism 100.

Figure 7:
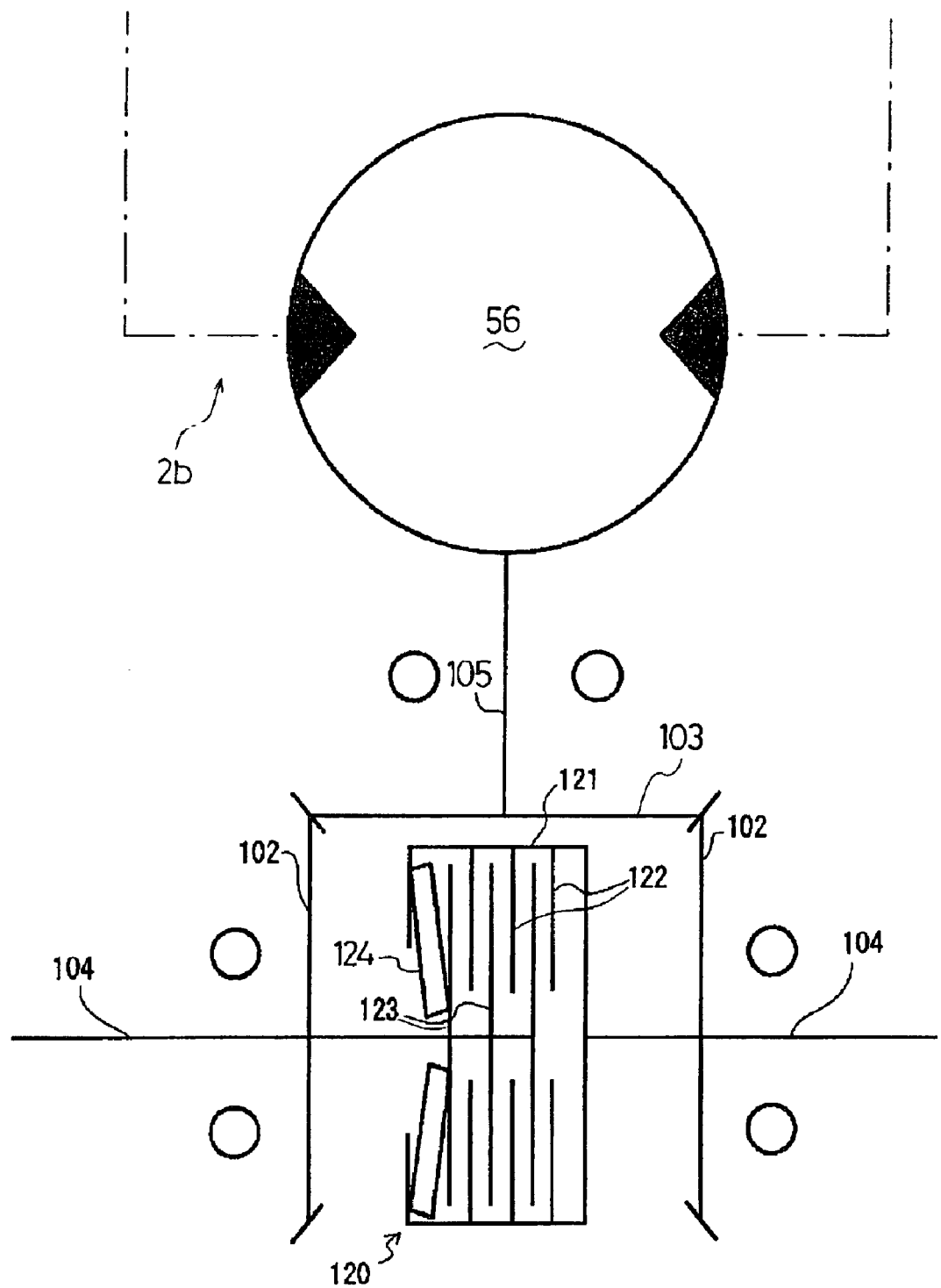

FIG. 7 is a structure diagram of the differential limiter 120 employed by the hydraulic driving apparatus shown in FIG. 6.

Figure 8:
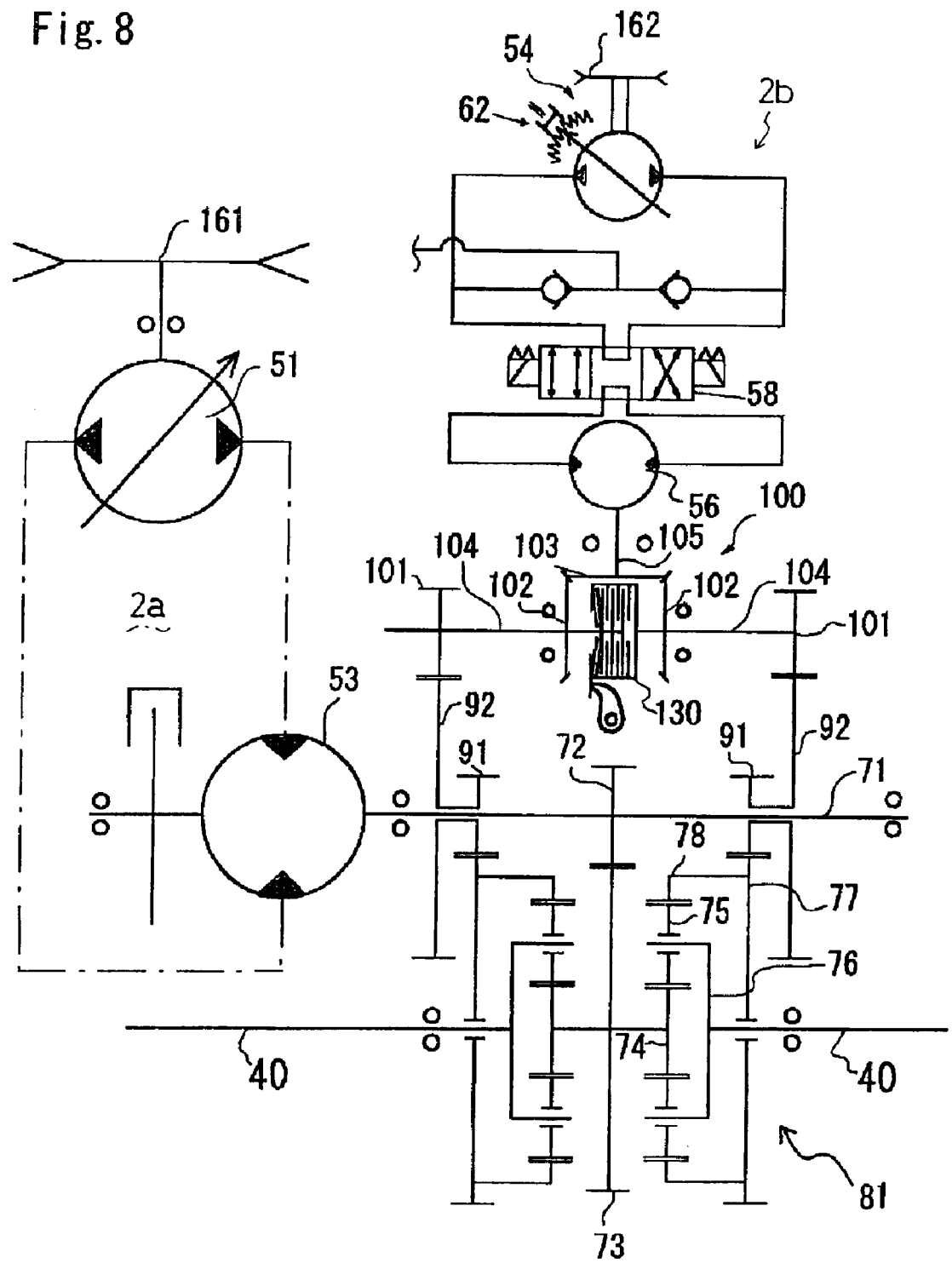

FIG. 8 is a structure and hydraulic circuit diagram of a hydraulic driving apparatus for a wheeled vehicle according to a second embodiment of the present invention, wherein a differential limiter 130 is interposed between the differential shafts 104 in the differential gear mechanism 100.

Figure 9:
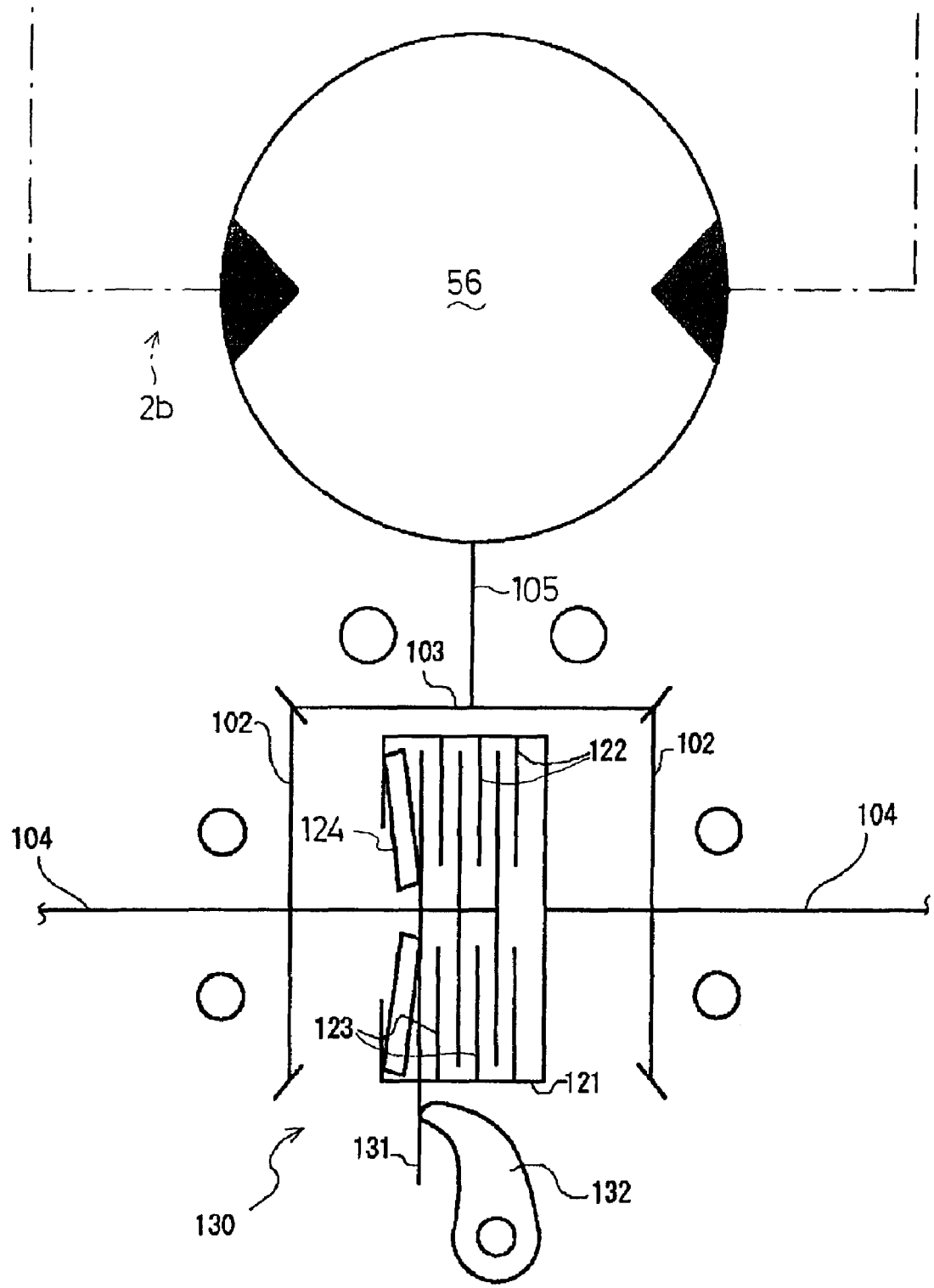

FIG. 9 is a structure diagram of the differential limiter 130 employed by the hydraulic driving apparatus shown in FIG. 8.

Figure 10:
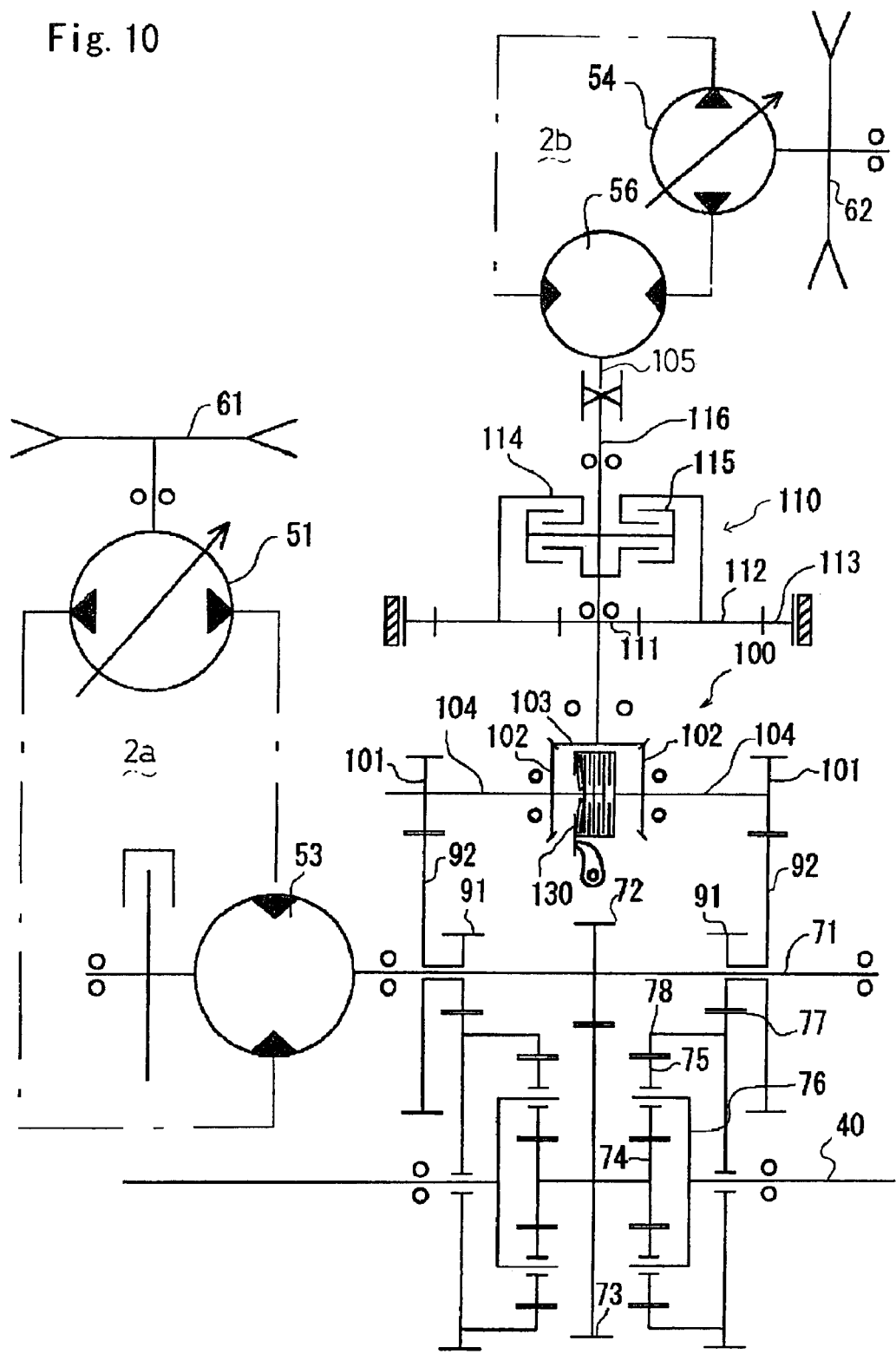

FIG. 10 is a structure and hydraulic circuit diagram of a hydraulic driving apparatus for a wheeled vehicle according to a third embodiment of the present invention, wherein the differential limiter 130 is interposed between the differential shafts 104 in the differential gear mechanism 100, and a deceleration gear mechanism 110 is interposed between the steering motor 56 and the differential gear mechanism 100.

Figure 11:
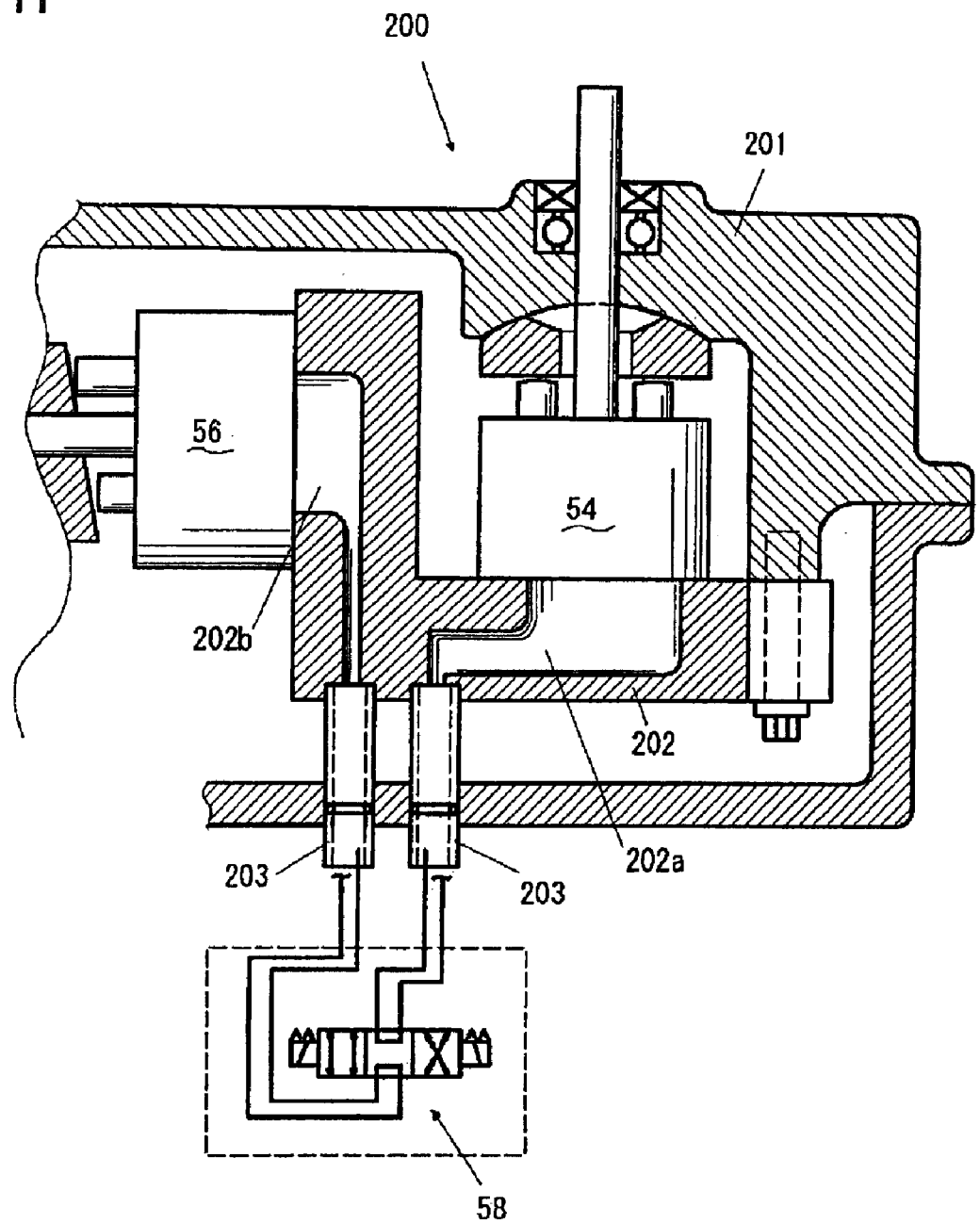

FIG. 11 is a sectional side view of an HST 200 serving as a first embodiment of the steering HST 2b connected with the switching valve 58.

Figure 12:
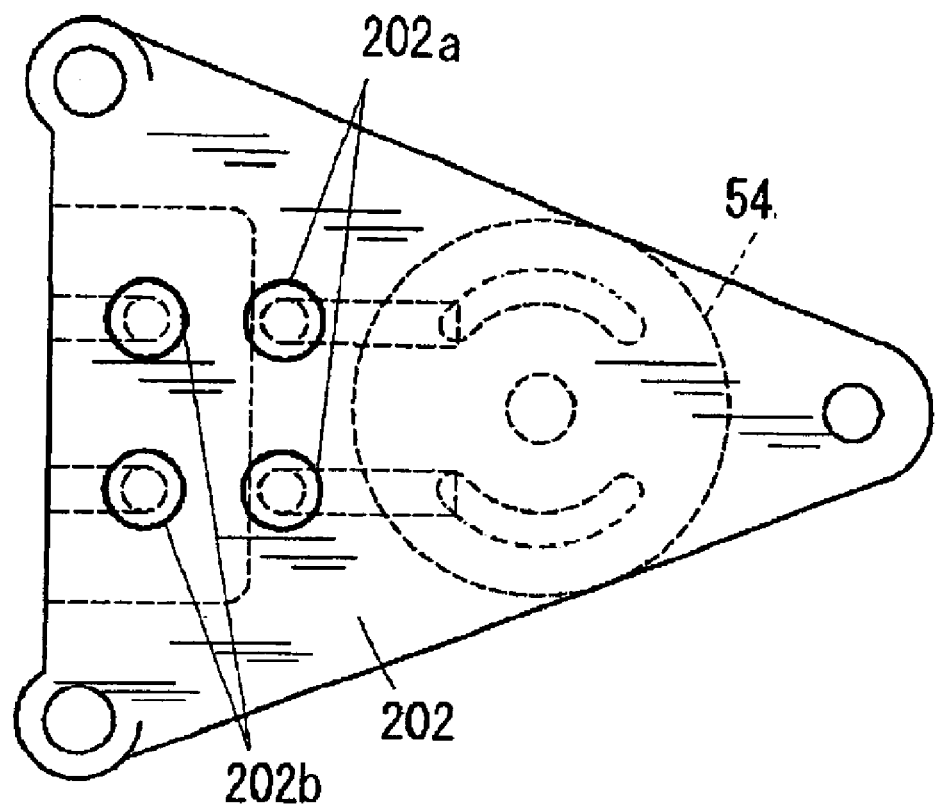

FIG. 12 is a bottom view of a center section 202 used for the HST 200 shown in FIG. 11.

Figure 13:
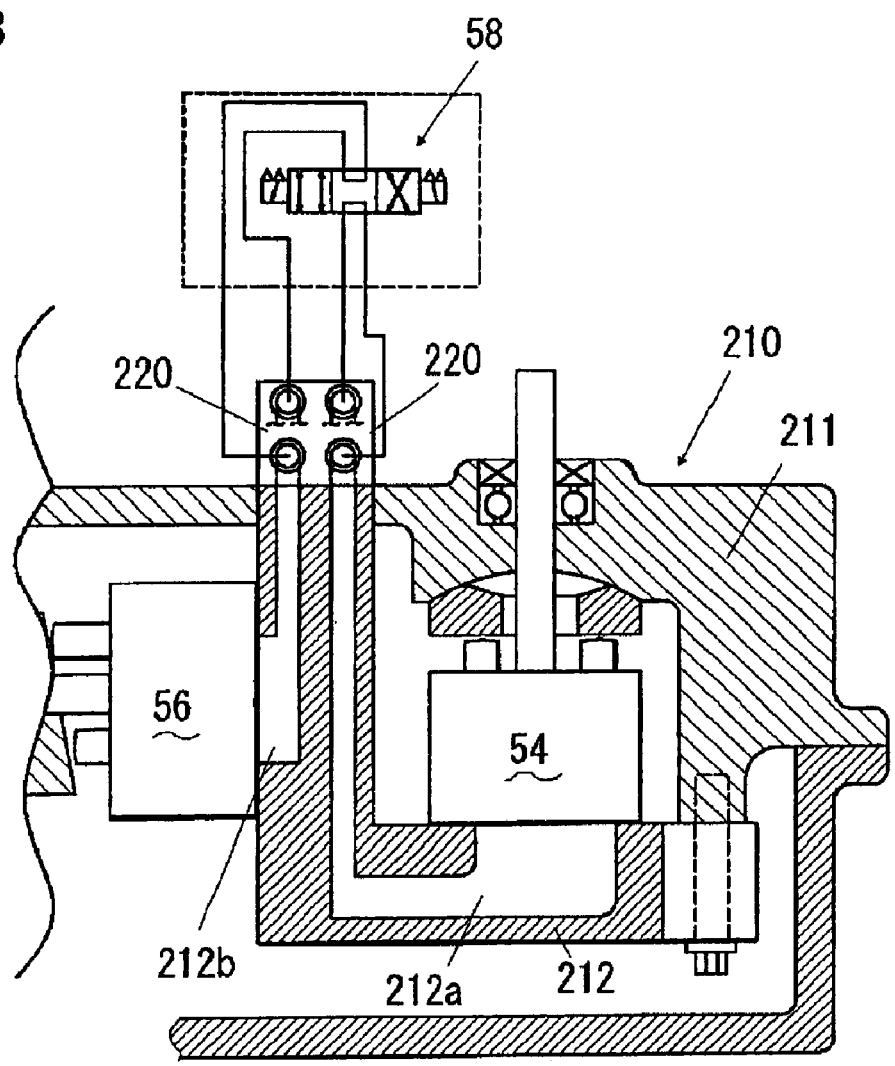

FIG. 13 is a sectional side view of an HST 210 serving as a second embodiment of the steering HST 2b connected with the switching valve 58.

Figure 14:
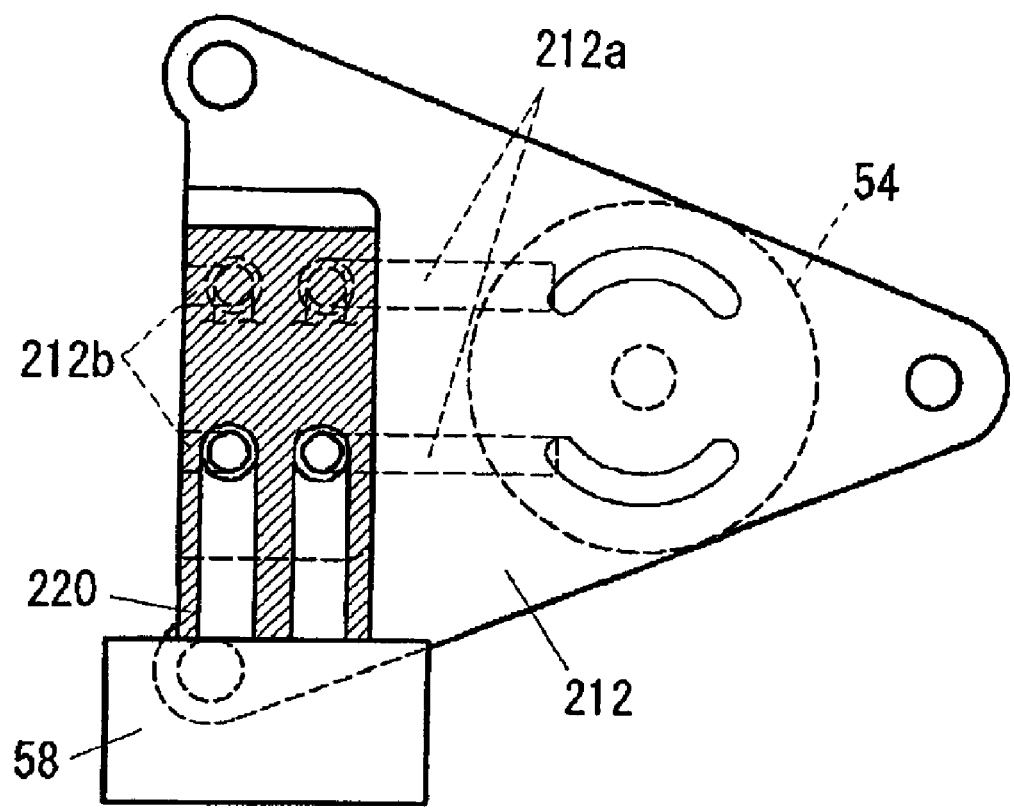

FIG. 14 is a plan view of a center section 212 used for the HST 210 shown in FIG. 13 in connection with the switching valve 58 through an adapter 220.

DETAILED DESCRIPTION OF THE INVENTION

Figure 1:
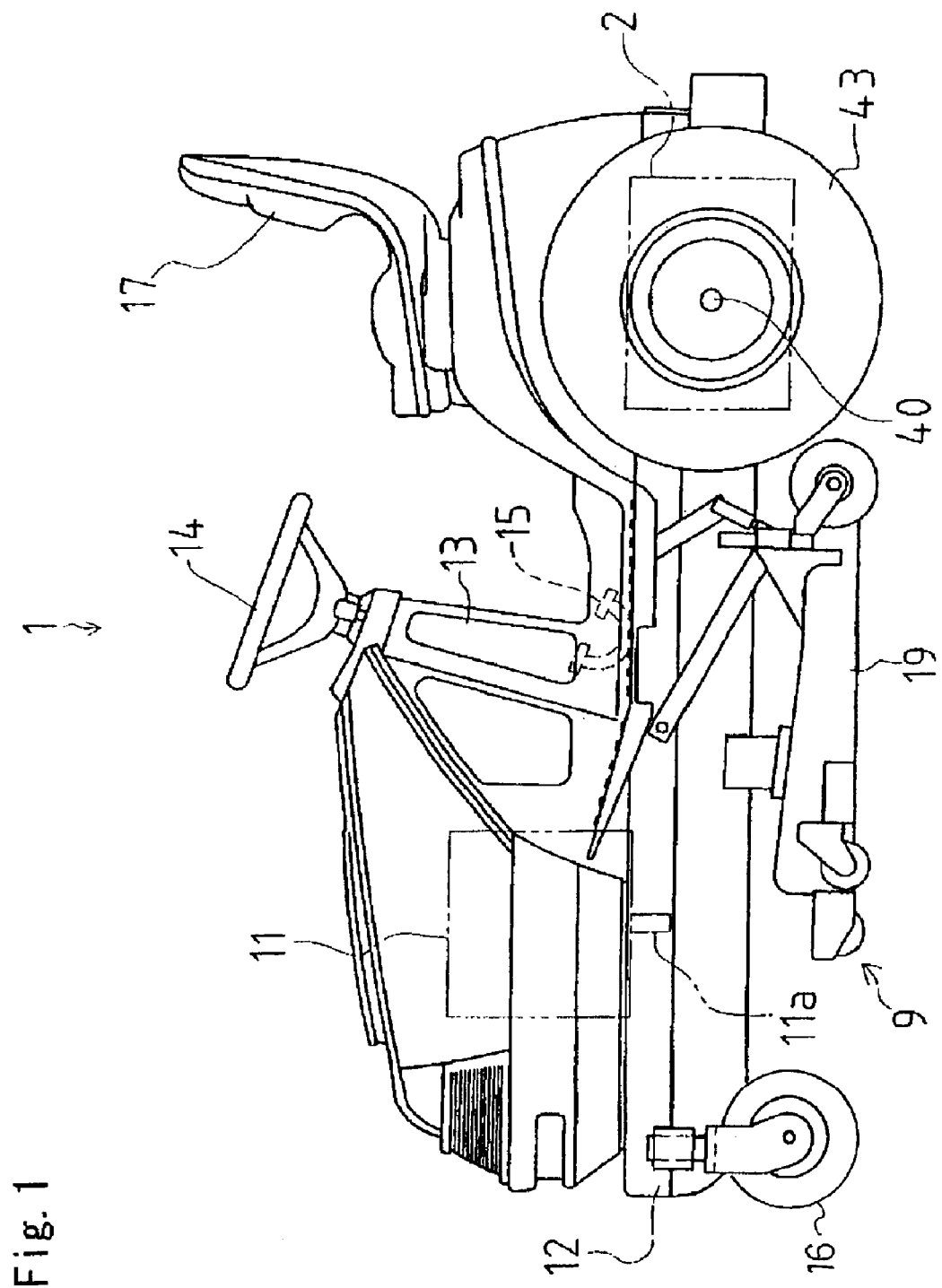
FIG. 1 is an entire side view of a lawn-mower tractor including a hydraulic driving apparatus of the present invention.

First, an entire construction of a lawn-mower tractor 1 as a wheeled vehicle equipped with a hydraulic driving apparatus according to the present invention will be described in accordance with FIG. 1. In the lawn-mower tractor 1, a front column 13 is provided upright on a front portion of a vehicle chassis 12. A steering wheel 14 as a steering control device is projected from the upper surface of the front column 13. An accelerator pedal 15 serving as a traveling speed control device and a brake pedal (not shown) are disposed adjacent to a foot portion of the front column 13.

The accelerator pedal 15 is constructed as a seesaw style, which is pivoted at its middle portion and has front and rear treading surfaces. The vehicle travels forward by treading the front surface of the pedal 15 and travels rearward by treading the rear surface thereof. The driving speed of the vehicle increases relative to the depth pedal 15 is depressed. Restoration springs (not shown) for biasing the accelerator pedal 15 to its neutral position are attached to the pedal 15.

Two casters 16 as driven front wheels are respectively disposed on the right and left sides of the lower front portion of the chassis 12. With regard to this embodiment, the two casters 16 are respectively disposed on right and left sides of the vehicle, but alternatively, a single caster wheel can be disposed on the center of the front portion of the chassis 12. Also, three or more caster wheels can be disposed on the chassis 12.

An engine 11 is disposed on the upper front portion of the chassis 12 and is covered with a bonnet. A seat 17 is disposed on the upper rear portion of the chassis 12. A mower 9 is disposed under the lower middle portion of the chassis 12.

The mower 9 is located in substantially longitudinally center of the tractor 1, and is taken as a so-called mid mount style. The mower 9 has a casing 19 which incorporates at least one blade driven by the engine 11 through a driving shaft, pulleys, belts or the like (not shown). The mower 9 is vertically movably suspended from the chassis 12 through a link mechanism.

The engine 11 is constructed as a vertical type, wherein an output shaft 11a is projected vertically downwardly. Driving force is transmitted to a hydraulic driving apparatus 2 disposed on the rear portion of the chassis 12 through pulleys, belts or the like (not shown). The hydraulic driving apparatus 2 drives drive wheels 43 disposed on right and left sides of the vehicle body 1 through a pair of right and left axles 40. The drive wheels 43 are disposed on the rear portion of the chassis 12, and the vehicle is taken as a so-called rear drive style.

The construction of the vehicle described above is only an example, and the invention is not limited to the described vehicle construction.

Figure 2:
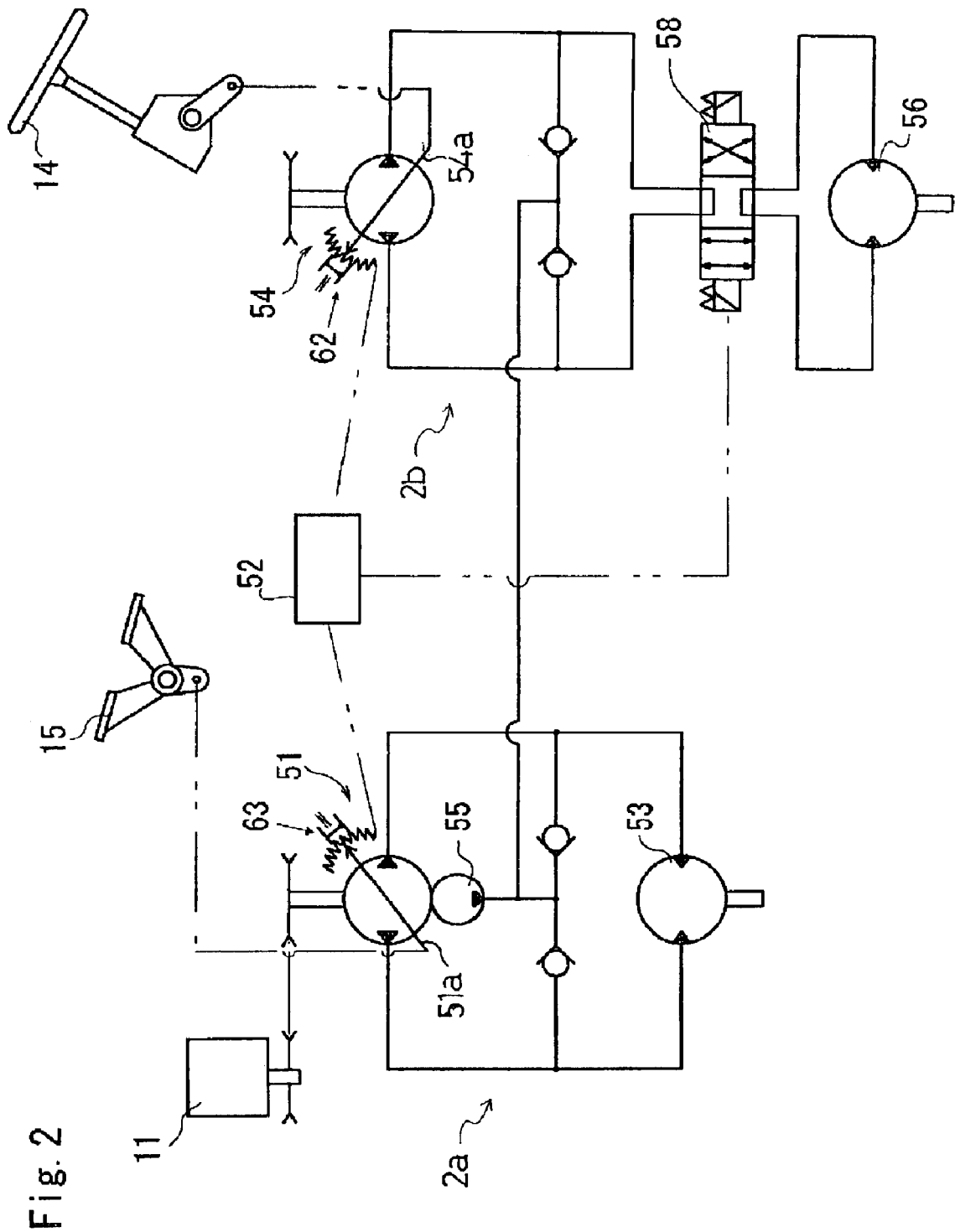
FIG. 2 is a hydraulic and electric circuit diagram of a traveling HST 2a and a steering HST 2b in the hydraulic driving apparatus.

Description will now be given on a construction of the hydraulic driving apparatus 2 in accordance with FIG. 2. The hydraulic driving apparatus 2 comprises a traveling hydrostatic transmission (traveling HST) 2a and a steering hydrostatic transmission (steering HST) 2b, into which output of the engine 11 is inputted respectively. A charge pump 55 is driven by the engine 11 so as to supply hydraulic fluid to respective hydraulic circuits of the HSTs 2a and 2b.

The traveling HST 2a comprises a variable displacement hydraulic pump (traveling pump) 51 and a hydraulic motor (traveling motor) 53. The accelerator pedal 15 is operationally connected to the traveling pump 51 so that depression of the accelerator pedal 15 changes the capacity of the traveling pump 51 so as to change driving speed of the traveling motor 53.

The steering HST 2b comprises a variable displacement steering pump 54 and a steering motor 56. The steering wheel 14 is operationally connected to the steering pump 54 so that operation of the steering wheel 14 changes the capacity of the steering pump 54 so as to change driving speed of the steering motor 56.

The steering HST 2b comprises a three-position switching valve 58 with four ports. The switching valve 58 is interposed across a pair of oil passages connecting the steering pump 54 with the steering motor 56. The switching valve 58 is connected to a controller 52 so that the switching valve 58 selectively supplies hydraulic fluid from the steering pump 54 to the steering motor 56 in selected one of opposite directions or cuts off the supply of hydraulic fluid according to the command from the controller 52.

With regard to this embodiment, a variable hydraulic pump with a movable swash plate serves as each of the hydraulic pumps 51 and 54. The accelerator pedal 15 is connected to a movable swash plate 51a of the traveling pump 51. The inclination of the movable swash plate 51a is controlled by operating the accelerator pedal 15 so as to change the capacity of the traveling pump 51, thereby changing driving speed of the traveling motor 53. The steering wheel 14 interlocks with a movable swash plate 54a of the steering pump 54. The inclination of the movable swash plate 54a is controlled by operating the steering wheel 14 so as to change the capacity of the steering pump 54, thereby changing driving speed of the steering motor 56.

As shown in FIG. 3, the movable swash plate 51a is selectively located among a neutral zone N51, a forward traveling range F51, and a rearward traveling range R51 opposite to the forward traveling range F51 with respect to the neutral zone N51. The movable swash plate 54a is selectively located among a neutral (straight traveling) zone N54, a right turning range R54, and a left turning range L54 opposite to the right turning range R54 with respect to the neutral zone N54.

The output rotational direction of the traveling motor 53 is uniformly decided by location of the movable swash plate 51a. That is, when the swash plate 51a is set in the forward traveling range F51, the traveling motor 53 rotates in one direction for driving the axles 40 forward. When the location of the swash plate 51a is changed to the rearward traveling range R51, the traveling motor 53 rotates oppositely so as to drive the axles 40 rearward. If the swash plate 51a is set in the neutral zone N51, the traveling motor 53 stops.

On the other hand, the output rotational direction of the steering motor 56 is decided not only by location of the movable swash plate 54a but also by location of the switching valve 58. More specifically, even if the swash plate 54a is located in the right turning range R54, the steering motor 56 rotates in selected one of opposite directions based on the location of the switching valve 58, which is controlled by the controller 52.

Description will now be given on control of the switching valve 58 based on recognition of a set mode of the traveling HST 2a and a set mode of the steering HST 2b by the controller 52.

The traveling pump 51 is provided with a traveling sensor 63 for detecting an inclination angle of the movable swash plate 51a, and the hydraulic motor 54 is provided with a steering sensor 62 for detecting an inclination angle of the movable swash plate 54a. Potentiometers may serve as the sensors 63 and 62. Both the sensors 63 and 62 are electrically connected to the controller 52. Thus, the controller 52 recognizes which range or zone the movable swash plate 51a of the traveling pump 51 is located in among the forward traveling range F51, the rearward traveling range R51 and the neutral zone N51 (i.e., which mode the traveling HST 2a is set in among a forward traveling mode, a rearward traveling mode and a stationary mode) based on the detected signal of the traveling sensor 63. Also, the controller 52 recognizes which range or zone the movable swash plate 54a of the steering pump 54 is located in among the right turning range R54, the left turning range L54 and the neutral zone N54 (i.e., which mode the steering HST 2b is set in among a right turning mode, a left turning mode and a straight traveling mode) based on the detected signal of the steering sensor 62.

Alternatively, the steering wheel 14 and the accelerator pedal 15 may be provided with respective sensors for detecting their positions. Based on the detection of these sensors, the controller 52 may recognize which mode the traveling HST 2a is set in among its three modes, and which mode the steering HST 2b is set in among its three modes.

The switching valve 58 is a three-position electromagnetic pilot valve. Controller 52 is electrically connected to the switching valve 58 and sends one of two opposite directive exciting pilot signals, which is decided based on the above-mentioned recognition thereof about the set modes of the HSTs 2a and 2b, to the switching valve 58, thereby shifting and locating the switching valve 58 to one of its three positions, i.e., a neutral position N, a forward traveling position F, and a rearward traveling position R.

The switching valve 58 located in the neutral position N cuts off the hydraulic fluid communication between the steering pump 54 and the steering motor 56 through the pair of fluid passages, that is, divides the hydraulic fluid circuit of the steering HST 2b into a shortcut circuit including the steering pump 54 and another shortcut circuit including the steering motor 56 which is independent of the shortcut circuit including the steering pump 54. Therefore, the rotation of the steering motor 56 is surely stopped regardless of flow of fluid discharged from the steering pump 54.

In the shortcut circuit on the side of steering pump 54, fluid is circulated by driving the steering pump 54 because of the drive of the engine. Hydraulic fluid in the shortcut circuit on the side of the steering motor 56 is essentially stationary. However, if the vehicle in straight traveling has the right and left drive wheels 43 receiving such different ground surface resistances as to drive the axles 40 differentially and apply a retroactive driving force to the motor 56, the hydraulic fluid is allowed to circulate in the shortcut circuit including the motor 56, thereby letting the motor 56 rotate softly, absorbing the differential resistance between the axles 40 or drive wheels 43, and protecting the steering pump 54 rotated by engine power from being damaged by backflow from the motor 56.

The switching valve 58 located in the forward traveling position F connects a pair of fluid passages extended from the steering pump 54 to a pair of fluid passages extended from the steering motor 56, respectively.

The switching valve 58 located in the rearward traveling position R connects the pair of fluid passages extended from the steering pump 54 to the respective fluid passages extended from the steering motor 56, while the fluid passages extended from the steering motor 56 to be connected to the respective fluid passages extended from the steering pump 54 side are interchanged with each other in comparison with those of the switching valve 58 located in the forward traveling position F. In other words, in relation to the discharge direction of the steering pump 54, the rotational direction of the steering motor 56 when the switching valve 58 is located in the rearward traveling position R is reversed in comparison with the rotational direction of the steering motor 56 when the switching valve 58 is located in the forward traveling direction F.

Description will be given on the position control of the switching valve 58 by the controller 52 based on the detection of sensors 62 and 63 according to a first logical diagram shown in FIG. 4.

When the controller 52 recognizes that the traveling sensor 63 detects the swash plate 51a tilted in its forward traveling range F51 (i.e., that the accelerator pedal 15 is depressed for forward traveling, or that the traveling HST 2a is set in the forward traveling mode), the controller 52 sets the switching valve 58 to the forward traveling position F. In this state, if the steering wheel 14 is rotated rightward so as to locate the movable swash plate 54a to the right turning range R54, the steering motor 56 rotates in one direction to accelerate the forwardly driving left axle 40 and to decelerate the forward driving right axle 40 (or accelerate the rearward driving right axle 40). Thus, the forward traveling vehicle turns right. When the steering wheel 14 is operated to set the swash plate 54a in the left turning range L54, vise versa.

On the contrary, when the controller 52 recognizes that the traveling sensor 63 detects the swash plate 51a tilted in its rearward traveling range R51 (i.e., that the accelerator pedal 15 is depressed for rearward traveling, or that the traveling HST 2a is set in the rearward traveling mode), the controller 52 sets the switching valve 58 to the rearward traveling position R. In this state, even if the steering wheel 14 is rotated rightward so as to locate the movable swash plate 54a to the right turning range R54, the steering motor 56 rotates in the other direction, which is opposite to the rotational direction of the steering motor 56 when the swash plate 54a is in the right turning range R54 and the switching valve 58 is located in the forward traveling position F. However, at this time, the axles 40 are driven rearward by the traveling motor 53. Consequently, the steering motor 56 rotates so as to accelerate the rearward driving left axle 40 and to decelerate the rearward driving right axle 40 (or accelerate the forward driving right axle 40), whereby the rearward traveling vehicle turns right.

When the controller 52 recognizes that the traveling sensor 63 detects the swash plate 51a located in its neutral zone N51 (i.e., that the accelerator pedal 15 is not depressed, or that the traveling HST 2a is set in neutral), the controller 52 sets the switching valve 58 to the neutral position N so as to surely stop the axles 40.

In this way, the controller 52 controls the location of the switching valve 58 based on detection of the traveling sensor 63, i.e., based on the set mode of the traveling HST 2a.

Additionally, for establishing the correlation shown in FIG. 4, the controller 52 locates the switching valve 58 to the neutral position N when the controller 52 recognizes that the steering sensor 62 detects the movable swash plate 54a located in its neutral zone N54 (i.e., that the steering wheel 14 is located in the straight traveling position, or that the steering HST 2b is set in neutral), the controller 52 sets the switching valve 58 to the neutral position N, thereby ensuring straight traveling of the vehicle. In other words, such a neutral setting of the switching valve 58 based on the neutral set mode of the steering HST 2b provides a dead zone to some degree in rotational response of the steering motor 56 to operation of the steering wheel 14 so as to delay the start of left or right turning of the vehicle considerably when the steering wheel 14 is rotated rightward or leftward from the straight traveling position. Therefore, while the accelerator pedal 15 is not depressed, the vehicle is kept in stationary and prevented from spinning even if the steering wheel 14 is turned.

Description will be given on the position control of the switching valve 58 by the controller 52 based on the detection of sensors 62 and 63 according to a second logic diagram shown in FIG. 5. For establishing a correlation shown in FIG. 5, the switching valve 58 is located to the forward traveling position F when the controller 52 recognizes that the traveling sensor 63 detects the movable swash plate 51a set in its neutral zone N51 and that the steering sensor 62 detects the movable swash plate 54a set in either its right or left turning range R54 or L54. Therefore, when the accelerator pedal 15 is not depressed and the steering wheel 14 is rotated rightward or leftward from the straight traveling position, the vehicle spins rightward or leftward so as to correspond to the rotational direction of the steering wheel 14.

The vehicle may be provided with means for selecting whether the controller 52 controls the switching valve 58 according to the first logical program of FIG. 4 or the second logical program of FIG. 5. For example, a driver may selectively switch on a spin-steering mode switch so as to control the switching valve 58 according to the logical program of FIG. 5, or switch off it so as to control the switching valve 58 according to the logical program of FIG. 6. Alternatively, the controller 52 may automatically select one of the logical programs of FIGS. 4 and 5 depending upon whether the controller 52 recognizes a driver sitting on the seat 17 or not. That is, if the driver sits on the seat 17, the controller 52 controls the switching valve 58 according to the logical program of FIG. 5 so as to enable the driver to operate for spinning a stationary vehicle. Unless the driver completely sits on the seat 17, the controller 52 selects the logical program of FIG. 4 so as to avoid unexpected spinning of the vehicle and keep the driver in safety. For detecting the driver sitting on the seat 17, a seating switch may be provided to the seat 17 so as to be switched on by sitting of the driver on the seat 17.

Description will now be given on a hydraulic driving apparatus for a wheeled vehicle shown in FIGS. 6 and 7 according to a first embodiment of the present invention, to which the driving system of FIG. 2 including the traveling HST 2a and the steering HST 2a with the switching valve 58 is adapted.

The driving force from the engine 11 is inputted to the variable capacity traveling pump 51 through a pulley 161, and inputted to the variable capacity steering pump 54 through a pulley 162.

In the traveling HST 2a, the traveling pump 51 is fluidly connected to the traveling motor 53 so as to drive the motor 53. An output (motor) shaft of the motor 53 is connected to a shaft 71. A gear 72 is fixedly disposed on the shaft 71. A brake device 50 is connected to the output shaft of the motor 53 so as to brake the output shaft of the motor 53.

The traveling motor 53 drives the gear 72 together with its output shaft and the shaft 71. The gear 72 transmits driving force to a sun-and-planet gear mechanism 81. The gear 72 is fitted with an input gear 73 of the sun-and-planet gear mechanism 81.

With regard to the sun-and-planet gear mechanism 81, the gear 73 is integrally disposed between a pair of sun gears 74 so that the sun gears 74 are rotated together with the gear 73. Planetary gears 75 are rotatably supported by each of two carriers 76 and fitted with each of the two sun gears 74. The carriers 76 are fixed to the respective axles 40. The axles 40 are relatively rotatably fitted through respective gears 77. The gears 77 integrally form respective ring gears 78 each of which has a toothed inner periphery. The planetary gears 75 are distributively and fittingly inscribed in the respective ring gears 78.

A pair of gears 91 fit with the respective gears 77 so that the sun-and-planet gear mechanism 81 transmits the rotations of the respective gears 91 to the respective corresponding axles 40.

The gears 91 integrally form respective gears 92. The shaft 71 extended from the motor shaft of the traveling motor 53 relatively rotatably passes through both the two sets of gears 91 and 92. The gears 92 are fitted with respective gears 101 which are a pair of differential output gears of a differential gear mechanism 100.

The gears 101 are fixed to a pair of coaxial differential shafts 104 of the differential gear mechanism 100, respectively. The differential gear mechanism 100 comprises two bevel gears 102 and a bevel gear 103. The bevel gear 103 is fitted with both the bevel gears 102 so that, by driving the bevel gear 103, one bevel gear 102 is rotated oppositely to the other bevel gear 102. The shafts 104 are fixed to the respective bevel gears 102. The shafts 104 are mutually connected through a later-discussed differential limiter 120 so that the shafts 104 are allowed to rotate in opposite directions but receive mutual resistant forces through the differential limiter 120. The differential gear mechanism 100 outputs driving force from the gears 101 to the sun-and-planet gear mechanism 81 through the gears 92 and 91.

A motor (output) shaft 105 of the steering motor 56 is extended to be fixed to the bevel gear 103 of the differential gear mechanism 100. In the steering HST 2b, the steering motor 56 is fluidly connected to the steering pump 54 through the switching valve 58 so that the output of the steering motor 56 relates to the amount of hydraulic fluid discharged from the steering pump 54. A pulley 162 is connected to the input shaft of the steering pump 54. Driving force from the engine 11 is inputted to the steering pump 54 through a belt wound around the pulley 162.

Due to this construction, while driving force from the traveling motor 53 is transmitted to the sun-and-planet gear mechanism 81 so as to drive the right and left axles 40 in the same direction, driving force from the steering motor 56 is transmitted to the sun-and-planet gear mechanism 81 through the differential gear mechanism 100, thereby ensuring that the rotational speed difference of the right and left axles 40 varies according to the drive speed of the motor shaft 105.

As mentioned above, the switching valve 58 is controlled in association with operation of the steering wheel 14, the acceleration pedal 15, and the means for detecting a driver sitting on the seat 17, so as to selectively change flow of hydraulic fluid from the steering pump 54 to the steering motor 56 or isolate the steering motor 56 from the steering pump 54.

As mentioned above, the steering HST 2b includes the switching valve 58 for protecting the steering HST 2b from unexpected resistant difference between the right and left axles 40. That is, the switching valve 58 forms the shortcut circuit including the steering motor 56 independent of the steering pump 54 when the steering wheel 14 is set in the straight traveling (neutral) zone. If such a large resistance difference as to rotate the motor shaft 105 is generated between the right and left axles 40, hydraulic fluid circulates in the shortcut circuit including the steering motor 56 so as to rotate the steering motor 56 following the shaft 105, thereby absorbing the load applied from the shaft 105 onto the steering motor 56.

However, if such a free rotation of the steering motor 56 following the shaft 105 rotated by the resistant difference between the axles 40 is entirely allowed while the steering wheel 14 is set in neutral, the straight movability of the vehicle is not ensured. Thus, for compensation for this effect of the switching valve 58, a differential limiter 120 is disposed in the differential gear mechanism 100. The differential limiter 120 gives a resistance to the relative (mutually opposite) rotation of the shafts 104.

When the opposite driving force difference between the right and left shafts 104 is smaller than the resistance of the differential limiter 120, the differential limiter 120 prevents the right and left shafts 104 from rotating. When the driving force difference becomes larger than the resistance of the differential limiter 120, the shafts 104 are rotated in opposite directions.

The differential limiter 120 comprises a carrier 121, friction shoes 122, friction plates 123, and a biasing member 124 such as a plate spring. The carrier 121 is fixed to one of the shafts 104. The friction shoes 122 are not-relatively rotatably fitted in the carrier 121. The friction plates 123 are not-relatively rotatably fitted around the other shaft 104. In the carrier 121, the friction shoes 122 and the friction plates 123 are arranged alternately.

The biasing member 124 is disposed between the outermost frictional plate 123 and the end of the carrier 121 so as to press the friction plates 123 against the friction shoes 122, thereby generating frictional force between the friction shoes 122 and the friction plates 123. This frictional force serves as the resistance of the differential limiter 120 between the shafts 104. Unless the driving force beyond the frictional force is transmitted to the right and left shafts 104, the shafts 104 are held so as not to rotate relative to each other. However, the construction of the differential limiter 120 is not limited to that shown in the attached drawings.

When uneven resistances are applied to the drive wheels 43 because of rough condition of the road surface, the right and left shafts 104 are subjected to unbalanced torque through the sun-and-planet gear mechanism 81 and the gears 92. The differential limiter 120 restrains this torque difference in a fixed range. The range of torque difference which can be restrained is controlled by adjusting the amount of frictional force generated in the differential limiter 120, e.g., changing the number of frictional shoes 122 or plates 123, or changing the biasing member 124.

Consequently, in the state where the vehicle travels with the steering wheel 14 kept in the neutral zone so as to locate the switching valve 58 in the neutral position N, even if a small torque difference is generated between the right and left drive wheels 43, the differential limiter 120 locks the right and left shafts 104 so as to restrain the small torque difference, thereby ensuring the straight movability of the vehicle. At this time, the motor shaft 105 is stopped so as to stop the steering motor 56.

If the torque difference is larger than the resistance of the differential limiter 120, the differential limiter 120 allows the shafts 104 to differentially rotate (in opposite directions). Therefore, in the steering HST 2b, fluid is circulated in the shortcut circuit including the steering motor 56 so as to rotate the steering motor 56 so that resistance hardly occurs in the rotating steering motor 56 and the steering motor 56 is protected. Also, the differential gear mechanism 100 and the sun-and-planet gear mechanism 81 interposed between the steering motor 56 and the axles 40 are prevented from excessive stress.

Further, while a vehicle with this hydraulic driving apparatus is set to travel straight, the drive wheels 43 are mutually locked or unlocked in correspondence to the ground surface condition, thereby protecting the ground surface. If the vehicle is the lawn-mower tractor 1 as shown in FIG. 1, the turf is prevented from being damaged by the mutually locked drive wheels 43, which do not softly vary in rotation corresponding to a rough ground surface.

Description will now be given on a hydraulic driving apparatus for a wheeled vehicle shown in FIGS. 8 and 9 according to a second embodiment of the present invention, which is the same as the hydraulic driving apparatus shown in FIGS. 6 and 7, except for the differential gear mechanism 100 including a differential limiter 130 serving as a modification of the differential limiter 120.

The differential limiter 130, which is switched on so as to generate a frictional resistance between the shafts 104 when the vehicle travels straight, is switched off so as to restrain the frictional resistance when the vehicle turns right or left. Therefore, the steering response of the vehicle is improved while the straight movability thereof is secured.

The differential limiter 130 comprises the carrier 121, the friction shoes 122, the friction plates 123 and the biasing member 124, similarly with the differential limiter 120. A difference between the differential limiter 130 and the differential limiter 120, is a pressure plate 131 slidably fitted to the carrier 121 and extended so as to abut against an arm 132 disposed beside the carrier 121. The biasing member 124 is pressed between the pressure plate 131 and the end of the carrier 121. The arm 132 is pivotally switched between a friction position and a release position so as to move the pressure plate 131. When the arm 132 is located at the friction position, the pressure plate 131 is located to apply the biasing force of the biasing member 124 onto the friction shoes 122 and plates 123, thereby generating frictional resistance between the shafts 104 so as to fix the shafts 104 to each other while the relative rotational force of the shafts 104 is less than the frictional resistance. When the arm 132 is located at the release position, the pressure plate 131 is located to release the biasing force of the biasing member 124 from the friction shoes 122 and plates 123, thereby extinguishing the frictional resistance between the shafts 104 and allowing the shafts 104 to rotate relative to each other without frictional resistance against each other.

The arm 132 may be operatively connected to the movable swash plate 54a or the steering wheel 14. By this connection, when the steering HST 2b is set in the neutral (straight traveling) mode, the pivotal arm 132 is switched to the friction position so as to generate resistance between the shafts 104, thereby ensuring the straight movability of the vehicle. When the steering HST 2b is set in the right or left turning mode, the arm 132 is switched to the release position so as to allow the shafts 104 to relatively rotate free from the friction resistance, thereby improving the right-and-left turning of the vehicle.

Furthermore, the arm 132 may be pivotally located so as to adjust the biasing force of the biasing member 124, thereby adjusting the friction resistance between the shafts 104.

Description will now be given on a hydraulic driving apparatus for a wheeled vehicle shown in FIG. 10 according to a third embodiment of the present invention, which is constructed similarly to the hydraulic driving apparatus according to the second embodiment including the differential limiter 130, except for a deceleration gear mechanism 110 interposed between the steering motor 56 and the differential gear mechanism 100.

The deceleration gear mechanism 110 comprises a sun gear 111, planetary gears 112, a ring gear 113, a carrier 114, a clutch 115 and a clutch shaft 116. The clutch shaft 116 is coaxially connected at one end thereof to the motor shaft 105 of the steering motor 56 while relative rotation of the clutch shaft 116 to the motor shaft 105 is allowed with some resistance (such as frictional resistance). The clutch shaft 116 is fixed at the other end thereof to the bevel gear 103 in the differential gear mechanism 100, and is fixedly provided on an intermediate portion thereof with the sun gear 111.

The sun gear 111 is fitted with the planetary gears 112. The planetary gear 112 is fitted with the ring gear 113 so as to be inscribed therein. The planetary gears 112 are pivoted to the carrier 114. The clutch shaft 116 is relatively rotatably fitted through the carrier 114. The clutch 115 is interposed between the clutch shaft 116 and the carrier 114.

By engaging the clutch 115, the clutch shaft 116 is connected to the carrier 114 so that the clutch shaft 116 loaded with the sun-and-planetary gears 111 and 112 overcomes the resistance against the motor shaft 105 and is rotated relative to the motor shaft 105, i.e., the clutch shaft 116 is rotated at a speed less than the motor shaft 105, thereby reducing the relative rotational speed of the shafts 104.

By disengaging the clutch 115, the clutch shaft 116 is separated from the carrier 114 so that the clutch shaft 116 is free from the load of the sun-and-planetary gears 111 and 112 and rotated substantially integrally with the motor shaft 105 by the resistance between the shafts 116 and 105, thereby rotating the bevel gear 103 substantially at the same speed with the motor shaft 105 so as to increase the relative rotational speed of the shafts 104.

The engaging and disengaging operation of the clutch 115 may be performed based on setting of the steering wheel 14 or the movable swash plate 54a, or based on setting of the accelerator pedal 15 or the movable swash plate 51a. For example, as the traveling speed of the vehicle is increased (as the accelerator pedal 15 is depressed deeper), the clutch 115 may be engaged so as to reduce the relative rotational speed of the shafts 104, thereby reducing the right and left turning angle of the vehicle relative to the rotational angle of the steering wheel 14, whereby the fast traveling vehicle is prevented from suddenly turning.

Description will now be given on a steering HST 200 shown in FIGS. 11 and 12, serving as an embodiment of the steering HST 2b in connection with the switching valve 58.

The HST 200 comprises a housing 201 incorporating the steering pump 54 and the steering motor 56. A center section 202 is fixedly disposed in the housing 201. The center section 202 is L-like shaped when viewed in side as shown in FIG. 11, and triangular when viewed in bottom as shown in FIG. 12. The steering pump 54 is vertically mounted onto a horizontal (right in FIG. 11) top pump-mounting surface of the center section 202. The steering motor 56 is horizontally mounted onto a vertical (left in FIG. 11) side motor-mounting surface of the center section 202.

A pair of oil passages 202a are formed in the center section 202 on the side of the steering pump 54. One end of each of the oil passages 202a is open at the pump-mounting surface so as to serve as each of kidney ports in communication with the steering pump 54 mounted onto the pump-mounting surface. The other end of each of the oil passages 202a is open at a bottom surface of the center section 202. A pair of oil passages 202b are formed in the center section 202 on the side of the steering motor 56. One end of each of the oil passages 202b is open at the motor-mounting surface so as to serve as each of kidney ports in communication with the steering motor 56 mounted onto the motor-mounting surface. The other end of each of the oil passages 202b is open at the bottom surface of the center section 202.

In correspondence to the four openings of the oil passages 202a and 202b at the bottom surface of the center section 202, four vertical holes penetrate a bottom wall of the housing 201. A vertical sleeve 203 is interposed between each hole in the bottom wall of the housing 201 and each opening of each oil passage 202a or 202b so as to be open to a correspondent each of the four ports of the switching valve 58 disposed outside the housing 201. By piping, the four ports of the switching valve 58 can be easily connected to the respective sleeves 203 open to the respective oil passages 202a and 202b.

The four ports of the switching valve 58 are a pair of first and second ports connected to the respective oil passages 202a and a pair of third and fourth ports connected to the respective oil passages 202b. The switching valve 58 located in the neutral position N mutually connects the first and second ports so as to constitute the above-mentioned shortcut circuit including the steering pump 54. Simultaneously, the switching valve 58 in the neutral position N mutually connects the third and fourth ports so as to constitute the above-mentioned shortcut circuit including the steering motor 56.

The switching valve 58 located in the forward traveling position F connects the first port to the third port, and simultaneously connects the second port to the fourth port, thereby constituting a hydraulic fluid circuit between the steering pump 54 and the steering motor 56 so that the forward traveling vehicle turns rightward or leftward in correspondence to the rotational side of the steering wheel 14 from the straight traveling position.

The switching valve 58 located in the rearward traveling position R connects the first port to the fourth port, and simultaneously connects the second port to the third port so as to reverse the rotational direction of the steering motor 56 relative to the discharge direction of the steering pump 54 in comparison with that when the switching valve 58 is located in the forward traveling direction F, thereby constituting another hydraulic fluid circuit between the steering pump 54 and the steering motor 56 so that the rearward traveling vehicle also turns rightward or leftward in correspondence to the rotational side of the steering wheel 14 from the straight traveling position.

Description will now be given on a steering HST 210 shown in FIGS. 13 and 14, serving as another embodiment of the steering HST 2b in connection with the switching valve 58.

The HST 210 comprises a housing 211 incorporating the steering pump 54 and the steering motor 56. A center section 212 is fixedly disposed in the housing 211. The center section 212 is L-like shaped when viewed in side as shown in FIG. 13, and triangular when viewed in plan as shown in FIG. 14. The steering pump 54 is vertically mounted onto a horizontal (right in FIG. 13) top pump-mounting surface of the center section 212. The steering motor 56 is horizontally mounted onto a vertical (left in FIG. 13) side motor-mounting surface of the center section 212.

In comparison with the center section 202, the vertical portion of the center section 212 fitted to the motor 56 is extended upward through a horizontal wall portion of the housing 211 above the center section 212 so that the top surface of the vertical portion (the highest top surface) of the center section 212 is exposed out of the housing 211 and is level with the external upper surface of the housing 211.

A pair of oil passages 212a are formed in the center section 212 on the side of the steering pump 54. One end of each of the oil passages 212a is open at the pump-mounting surface so as to serve as each of kidney ports in communication with the steering pump 54 mounted onto the pump-mounting surface. Each of the oil passages 212a is extended upward in the vertical portion of the center section 212 fitted to the motor 56 so that the other end thereof is open at the highest top surface of the center section 212. A pair of oil passages 212b are formed in the center section 212 on the side of the steering motor 56. One end of each of the oil passages 212b is open at the motor-mounting surface so as to serve as each of kidney ports in communication with the steering motor 56 mounted onto the motor-mounting surface. The other end of each of the oil passages 212b is also open at the highest top surface of the center section 212.

An adapter 220 having four vertical holes corresponding to the respective oil passages 212a and 212b is attached to the highest top end surface of the center section 212 at the horizontal upper surface of the housing 211 so as to facilitate connecting the pair of oil passages 212a and the pair of oil passages 212b to the four ports of the switching valve 58. As shown in FIG. 14, the switching valve 58 may be directly attached to the adapter 220 without piping. In the adapter 220 shown in FIGS. 13 and 14, the four vertical holes are connected to the respective horizontal holes which are open at a vertical side surface thereof. The switching valve 58 may be directly attached to this vertical side surface of the adapter 220, as shown in FIG. 14. In this way, the adapter 220 also facilitates changing the fluid flow direction between the center section 212 and the switching valve 58.

For another embodiment of the steering HST 2b in connection with the switching valve 58, a center section of the steering HST 2b may be further extended so as to project outward from a housing of the steering HST 2b, and the switching valve 58 may be directly attached to the portion of the center section outside the housing, thereby requiring no additional member.

It is further understood by those skilled in the art that the foregoing description is a preferred embodiment of the disclosed apparatus and that various changes and modifications may be made in the invention without departing from the spirit and scope thereof.

What is claimed is:

1. A hydraulic driving apparatus for a wheeled vehicle including a prime mover and a pair of wheels, comprising;
   a stepless transmission mechanism for traveling which transmits driving force from said prime mover to said drive wheels so as rotate said drive wheels in a common forward or rearward direction;
   a steering transmission mechanism including a hydrostatic stepless transmission including a variable hydraulic pump and a hydraulic motor fluidly connected to each other, wherein a rotational force of said hydraulic motor is divided into opposite directive rotations transmitted to said respective drive wheels;
   traveling operation means for changing speed of said common rotation of said drive wheels and for switching said common rotational direction of said drive wheels between a forward direction and a rearward direction;
   steering operation means for changing the rotational speed of said hydraulic motor and switching the rotational direction of said hydraulic motor between opposite directions;
   a switching valve disposed between said variable hydraulic pump and said hydraulic motor in said steering transmission mechanism, wherein said switching valve is controlled based on setting of said traveling operation means;
   a neutral position for location of said switching valve, wherein said switching valve is located in said neutral position so as to isolate said hydraulic motor from said variable hydraulic pump when said traveling operation means is set for stopping said drive wheels;
   a forward traveling position for location of said switching valve, wherein said switching valve is located in said forward traveling position so as to fluidly connect said hydraulic motor with said variable hydraulic pump when said traveling operation means is set for rotating said drive wheels in a forward direction; and
   a rearward traveling position for location of said switching valve, wherein said switching valve is located in said rearward traveling position so as to fluidly connect said hydraulic motor with said variable hydraulic pump when said traveling operation means is set for rotating said drive wheels rearward, and wherein, in relation to the discharge direction of said variable hydraulic pump, the rotational direction of said hydraulic motor when said switching valve is located in said rearward traveling position is reversed in comparison with the rotational direction of said hydraulic motor when said switching valve is located in said forward traveling position.

2. The hydraulic driving apparatus as set forth in claim 1, wherein said switching valve is also controlled based on setting of said steering operation means.

3. The hydraulic driving apparatus as set forth in claim 2, wherein said switching valve is located in said neutral position when said steering operation means is set for stopping said hydraulic motor whether said traveling operation means is set for rotating said drive wheels forward or rearward.

4. The hydraulic driving apparatus as set forth in claim 3, wherein said switching valve is located in either said forward traveling position or said rearward traveling position even when said traveling operation means is set for stopping said drive wheels unless said steering operation means is set for stopping said hydraulic motor.

5. The hydraulic driving apparatus as set forth in claim 3, wherein said switching valve is selectively controlled according to either a first logic program or a second logic program, wherein, according to said first logic program, said switching valve is located in said neutral position whenever said traveling operation means is set for stopping said drive wheels, and wherein, according to said second logic program, said switching valve is located in either said forward traveling position or said rearward traveling position even when said traveling operation means is set for stopping said drive wheels unless said steering operation means is set for stopping said hydraulic motor.

6. The hydraulic driving apparatus as set forth in claim 5, wherein one of said first logic program and said second logic program is selected at an operator's option or based on detection of an operator sitting on a seat of a wheeled vehicle having said driving apparatus.

7. The hydraulic driving apparatus as set forth in claim 1, wherein, when said switching valve is located in said neutral position, said switching valve makes a hydraulic fluid circuit including said hydraulic motor, which is independent of said variable hydraulic pump, and in which hydraulic fluid circulates according to rotation of said hydraulic motor.

8. The hydraulic driving apparatus as set forth in claim 7, wherein, when said switching valve is located in said neutral position, said switching valve makes a hydraulic fluid circuit including said variable hydraulic pump, which is independent of said hydraulic motor, and in which hydraulic fluid circulates according to rotation of said hydraulic pump.

9. The hydraulic driving apparatus as set forth in claim 1, further comprising;
a differential limiting mechanism for limiting a differential rotation of said drive wheels.

* * * * *